May 19, 1936.    J. DONDERER    2,041,460
TRACTOR WHEEL
Filed March 23, 1933    2 Sheets-Sheet 1

Josef Donderer

May 19, 1936.　　　J. DONDERER　　　2,041,460
TRACTOR WHEEL
Filed March 23, 1933　　　2 Sheets-Sheet 2

Josef Donderer

Patented May 19, 1936

2,041,460

UNITED STATES PATENT OFFICE 2,041,460

TRACTOR WHEEL

Josef Donderer, Augsburg, Germany, assignor of one-half to Lorenz Sussmeier, Augsburg, Germany Application March 23, 1933, Serial No. 662,302
In Germany April 21, 1932

6 Claims. (Cl. 301—46)

This invention relates to a device for adjusting the grippers on driving wheels of motor vehicles having radially arranged road grips held in a ring which is fixed against and rotates with each rear wheel. Devices are known in which ribs are provided on the flanks of the road grips and engage in spirally grooved rings rotated relatively to the road grips by means, such as a brake, so that the ribs move in the spiral grooves and cause the whole of the said road grips to simultaneously project radially beyond the periphery of the tires. According to the invention the device is actuated by a single brake the brake disc of which is retarded relative to the driving wheel by braking when travelling, so that an internal toothed rim of the brake disc rotates always in the same direction a common pinion rotatable on a bolt of the driving wheel disc and swings relative to the driving wheel a control strap arranged on a ring, so that the grippers, which are connected to an adjusting disc coupled with the strap by catches, are alternately pushed outwards and then pulled inwards.

Three embodiments of the invention are illustrated by way of example in the accompanying drawings in which:—

Figure 1:
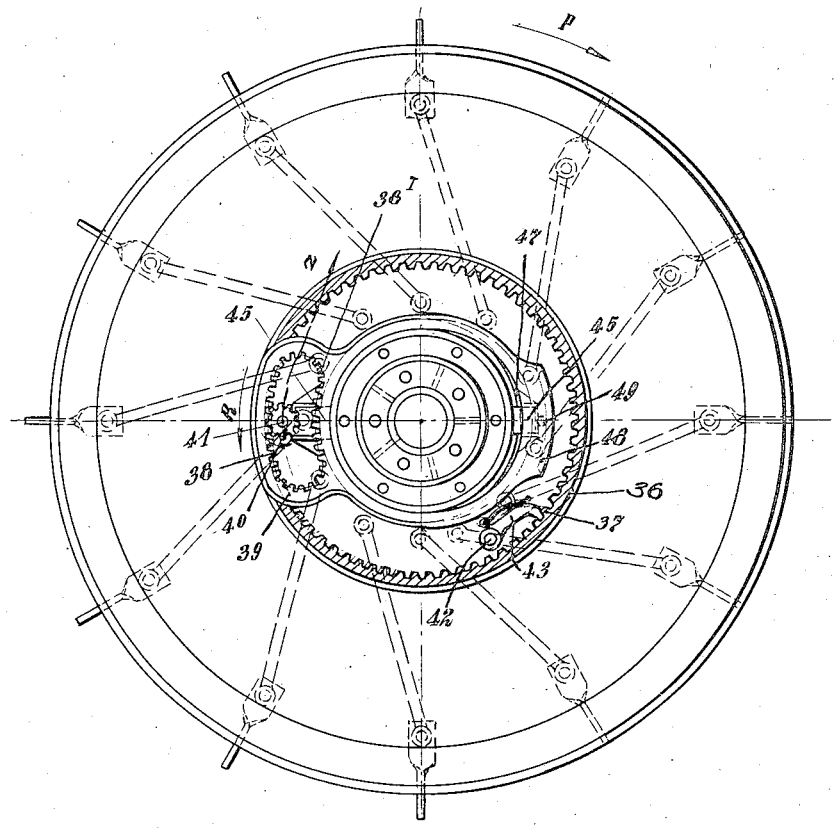
Fig. 1 shows a tractor wheel according to the invention, the greater part of the brake strap being broken away to expose the parts thereunder.
Figure 2:
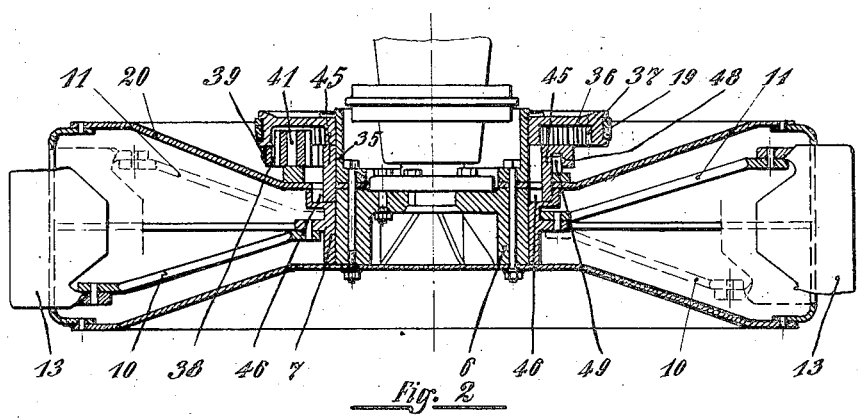
Fig. 2 is a cross section through the tractor wheel shown in Fig. 1.

In order to enable the adjustment of the grippers by means of only one brake 19 of the control collar 7 mounted on a hub 6 of the driving wheel, the connecting rods 10, 11 of the grippers being hingedly mounted on said control collar, a ring 35 is rigidly connected with the hub 6 and on this ring a brake disc 36 is slidably mounted.

The brake disc 36 is provided with an internally toothed rim 37, which is moved, at the same time as the internally toothed rim 38 of the control strap 39 situated at the side of the toothed rim 37, by means of a common pinion 40 rotatably mounted on a bolt 41.

The bolt 41 carrying the pinion 40 is fixed on the driving wheel disc 20. This disc 20 also carries a bolt 42, on which a locking pawl 43 provided with a spring is mounted and can engage in the internally toothed rim 37 of the brake disc 36. Two or three locking pawls may be provided to make the device more reliable.

The object of the locking pawl 43 is to hold the adjusted grippers 13 in position when the brake 19, applied for fixing the grippers, is released.

The control strap 39 has an aperture 47 of elliptical shape to enable the strap to be shifted slightly over the ring 35 towards the bolt 41.

Catches 45 are arranged on one side of the control strap 39 and engage in gaps 46 in the control collar 7, in order to rotate the same. The control strap 39 is provided with a guide bar 48 on its end remote from the internally toothed rim 38.

The control strap 39 is guided by this guide bar 48 on a bolt 49 fixed on the driving wheel disc 20. When the brake 19 is applied and the brake disc 36 for fixing the grippers is stopped, the pinion 40 is moved by the rotation of the driving wheel.

If, for example the larger arc portion of the internally toothed rim 38 is actuated by the pinion 40 for pushing out the grippers, this being effected by applying the brake 19, the strap 39 is moved relative to the driving wheel in the direction of the arrow R, the other end of the control strap 39 sliding at the same time in opposite direction along the inner curve of the guide bar 48 on the bolt 49.

If the pinion 40 moves along into one of the small curves of the internally toothed rim 38, the control strap 39 is lifted towards the bolt 41. During this shifting movement of the control strap 39 the outer end of the guide bar 48 will finally slide past the bolt 49. During a further movement of the pinion 40 on the inner toothed portion 38$^I$, which serves for pulling in the grippers 13, the outer curve of the guide bar 48 slides on the bolt 49, which now supports the control strap 39, so that the pinion 40 properly engages and can shift the inner toothed portion 38$^I$ for pulling in the grippers 13.

The grippers 13 guided on the wheel rim of the driving wheel disc may be arranged parallel or obliquely to the wheel axle.

The operation is as follows:—

If, for example, the grippers are adjusted radially outwards when the vehicle is travelling, the brake 19 is applied and thus the brake disc 36 arrested, which now slides on the ring 35.

Owing to the rotation of the driving wheel in the direction P the bolt 41 fixed on the disc 20 is moved in the same direction, so that the pinion rotatably mounted on this bolt rotates in the direction of the arrow indicated in Fig. 1 and moves the control strap 39 with its inner teeth in the direction of the arrow R relative to the driving wheel.

By this short turning movement of the control strap 39 its catches 45, which engage in the gaps 46 of the control collar 7, rotate this latter. During the common rotating movement of the control strap 39 on the outer portion of the teeth 38 and of the control collar 7, the grippers 13 hingedly mounted on the connecting rods 10 and 11 are shifted radially outwards as long as the brake 19 is applied. When the grippers 13 have been pushed out sufficiently far to engage in the ground, the brake 19 can be released because one or more locking pawls 43, which are pivotally mounted on a bolt 42 fixed on the disc 20 and pressed by a spring into the internally toothed rim 37 of the brake disc 36 (Fig. 1) lock the brake disc and therefore the grippers 13 in the adjusted position.

When it is desired to return the grippers 13 into their inoperative position, this is effected in a simple manner by again applying the brake 19 from the driver's seat. Thus, the brake disc 36 is locked causing the locking pawls 43 to disengage from the teeth 37 of the brake disc 36.

As the driving wheel now continues to rotate in the direction P, the bolt 41 is likewise moved in this direction with the pinion 40, the latter, however, rolls on the inner teeth 38 of the small curve and thus lifts the control strap 39 towards the bolt 41 and drives the section 38¹ on the inner teeth 38, so that the control strap 39 is now shifted in the direction Z.

Owing to this shifting movement, the catches 45 of the control strap 39 move the control collar 7 so that the grippers 13 can be drawn in by the connecting rods.

Figure 3:
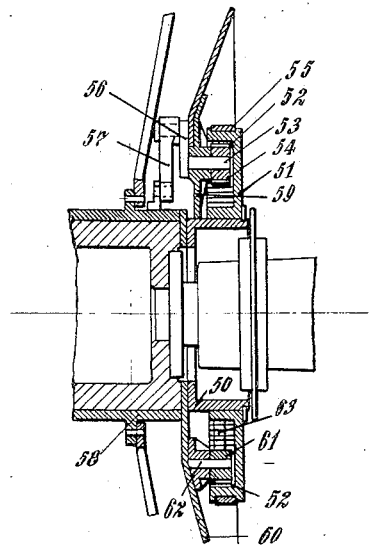
Fig. 3 shows in part cross section a modified form of construction with a crank drive.
Figure 4:
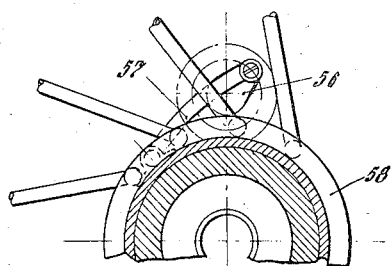
Fig. 4 is a part elevation of Fig. 3.
Figure 5:
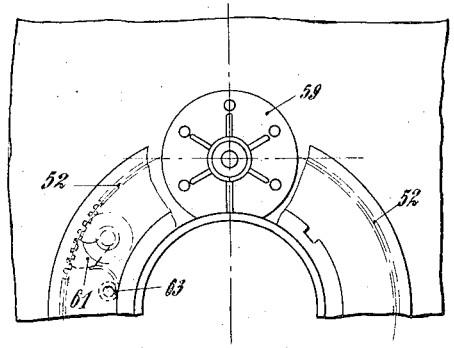
Fig. 5 shows a detail of Fig. 4 in elevation.

Another solution of the problem of pushing out and pulling in the grippers on the driving wheels of motor vehicles by only one brake is illustrated in Figs. 3 to 5.

In this instance the brake wheel 51 is guided on a ring 50. The brake disc 51 has an internally toothed rim 52 in which a pinion 54, keyed on a crank shaft 53, engages so that, when the brake 55 is applied and the brake disc 51 stopped, the pinion 54 and the crank 56 are rotated by the rotation of the driving wheel, the connecting rod 57 of the control collar 58 being shifted and the grippers 13 hingedly mounted on this control collar being adjusted.

The crank shaft 53 is journalled in a bearing 59 fixed on the driving wheel disc 60.

One or more locking pawls 61, which engage in the toothed rim 52 of the brake disc 51, serve for locking the adjusted grippers.

The locking pawl 61 is rotatably mounted by a bolt 62 carried by the driving wheel disc 60 and provided with a spring 63.

Figure 6:
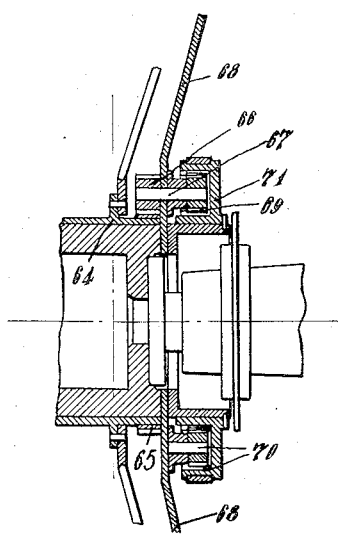
Fig. 6 is a part cross section showing a third form of construction with a brake disc and mutually displaced toothed segments.
Figure 7:
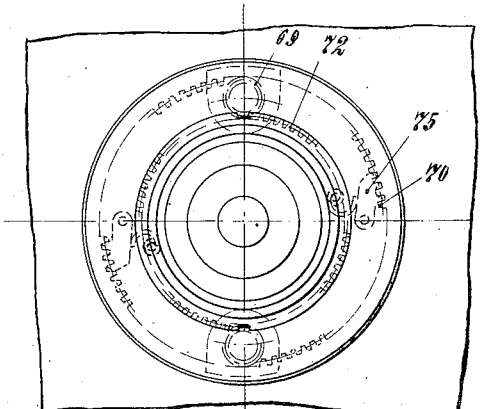
Fig. 7 is a part elevation of Fig. 6.

Another solution of the problem of adjusting the grippers on driving wheels of motor vehicles by only one brake is illustrated in Figs. 6 and 7. In this form of construction a toothed rim 65 is arranged on a control collar 64 and meshes with a pinion 66 keyed on a bolt 67 rotatably mounted in the driving wheel disc 68. On the other end of the bolt 67 a second pinion 69 is keyed which meshes with a toothed segment 70 or 72 of the brake disc 71. The driving wheel disc 68 also carries a bolt 67' diametrically opposite the bolt 67 and on a bolt 67' a pinion 69' is rotatably mounted and likewise meshes with the toothed segments 70 or 72 to reliably guide the brake disc 71.

When the brake is applied and the brake disc 71 stopped, the pinion 69 is rotated on the toothed segment 70 of the brake disc 71 by the rotation of the driving wheel and at the same time the pinion 66 rotates the control collar 64 through the intermediary of the toothed rim 65 so that the grippers hingedly connected to the collar are radially shifted in outward direction.

If the grippers are to be drawn inwards, the brake disc 71 is stopped by the brake and the pinion 69 then engages with toothed segment 72 so that, owing to the rotation of the driving wheel in the direction of the arrow P, the pinion 66 rotates the toothed rim 65 in the opposite direction, causing the control collar 64 to pull in the grippers articulated on this collar 64.

In this instance the grippers are likewise locked by locking pawls 75, which engage in the toothed segment 70, as soon as the brake is released.

I claim:—

1. A device for adjusting grippers on tractor wheels, comprising in combination with a driving wheel disc and a hub, a ring on said hub, a brake disc with internally toothed rim guided on said ring said brake disc adapted to be braked and temporarily locked when the tractor is travelling, a crank shaft journalled in said driving wheel disc, a pinion keyed on said crank shaft meshing with said toothed rim and adapted to be rotated by said rim when said brake disc is locked, a crank keyed to said crank shaft, a connecting rod connected at one end to said crank, a control collar connected to the other end of said connecting rod and adapted to be reciprocated during the rotation of said crank shaft, and grippers linked to said control collar adapted to be moved in and out during the reciprocation of said collar.

2. A device for adjusting grippers on tractor wheels, comprising in combination a driving wheel, a driving wheel hub, a brake disc adapted to be braked and temporarily locked when the tractor is travelling, toothed segments radially displaced on internal and external toothed rims on said brake disc, a pinion on said driving wheel adapted to alternately engage said toothed segments, a bolt carrying said pinion at one end, a control collar on said hub having a toothed rim, a second pinion on the other end of said bolt meshing with said toothed rim to reciprocate said control collar, and grippers linked to said collar and adapted to be moved in and out during the reciprocation of said collar.

3. A device for adjusting the grippers on a tractor wheel, comprising in combination with the grippers, a driving disc wheel, a hub on said wheel, a brake disc on said hub, means for braking and temporarily locking said brake disc when the tractor is travelling, a control collar carried by said hub and carrying the grippers, a gearing between said brake disc and said control collar adapted to be actuated by said brake disc to impart a reciprocating movement to said control collar, and means connecting said control collar to said grippers for moving said grippers in and out during the reciprocation of said control collar.

4. A device for adjusting the grippers of tractor wheels, comprising in combination a driving wheel having a hub, a ring rigidly connected with the hub, a brake disc slidably mounted on said ring and having an internally toothed rim, a bolt on said driving wheel, a pinion adapted to be rotated in one direction by said toothed rim, a control strap on said ring adapted to be reciprocated by said pinion relatively to said driving wheel, a control collar on said hub, grippers hingedly connected with said control collar, catches on said control strap adapted to couple said collar with said control strap to transmit the reciprocating movement of said control strap to said collar to push out and pull in said grippers.

5. A device as specified in claim 4, comprising in combination with the pinion, the control strap having two sections of teeth standing oppositely the one to the other which are raised and lowered in their extreme positions by said pinion to impart an endless alternate reversal of the movement to said strap.

6. A device as specified in claim 4, comprising in combination with the control strap and the pinion, an automatically reversing bar fixed to said control strap and having inner and outer curved faces, a toothed portion on said strap meshing with said pinion, a bolt against which said guide bar when the device is operated presses alternately first with its inner curved and then with its outer curved surface to positively maintain said pinion in mesh with said toothed portion.

JOSEF DONDERER.